May 13, 1969 W. J. BROWN 3,444,543
MONITOR CIRCUIT
Filed Dec. 22, 1964
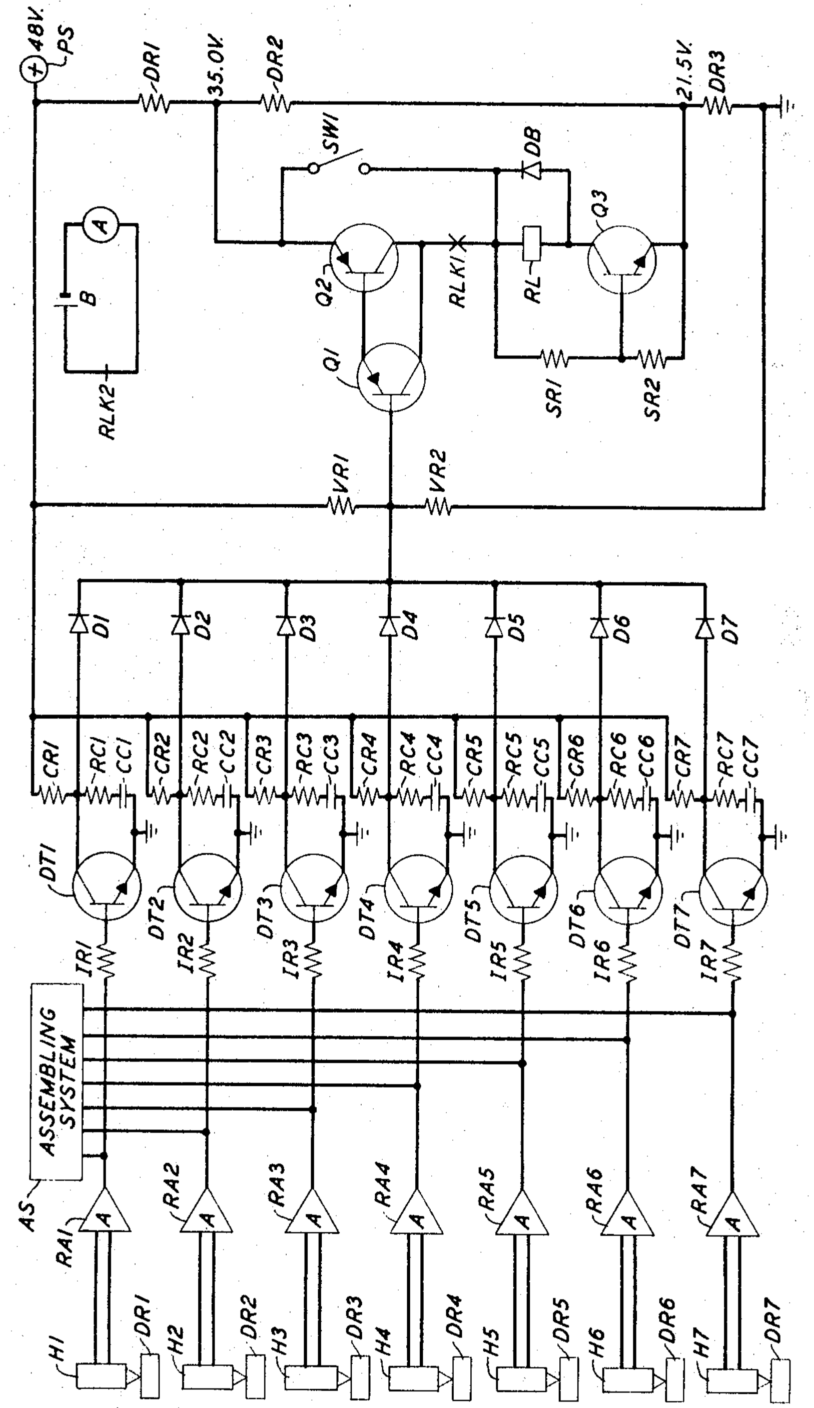
INVENTOR
W. J. BROWN
BY Leo Stanger
ATTORNEY

3,444,543 MONITOR CIRCUIT

William J. Brown, Brielle, N.J., assignor to Bell Telephone Laboratories, Incorporated, New York, N.Y., a corporation of New York Filed Dec. 22, 1964, Ser. No. 420,310
Int. Cl. G08b 29/00; H03k 5/20; G11b 5/00
U.S. Cl. 340—213 9 Claims

ABSTRACT OF THE DISCLOSURE

A monitor system simultaneously senses signals in a number of magnetic playback channels and combines them so that a departure of one or more playback signals from a predetermined value turns off a high amplification, high input impedance, direct-coupled amplifying device that in turn de-energizes a relay. To prevent high cutoff currents in the amplifying device from preventing de-energization of the relay coil a second amplifying device whose main current flow path is also in series with the relay coil senses the voltage across the relay coil with its control electrode. Only a slight drop in relay current due to actuation of the first direct-coupled amplifying device is sufficient to turn off the second amplifying device and hence completely de-energize the relay coil.

This invention relates to monitor circuits and more particularly to control circuits responding to one or more departures of several monitored conditions from predetermined ranges to thereby operate a single relay. A specific object of the invention is to supervise simultaneously the playback of a large number of recordings that are assembled in a telephone exchange to produce telephone messages such as "At the tone, the time will be eleven thirty-three . . .," or "I am sorry, the number you have reached three, four, five, six, seven, eight, nine has been changed to seven, six, five, four, three, two, one."

Such messages are assembled from separate phrases. That is, a plurality of pickup heads constantly sense respective rotating magnetically recorded drums each repeating one spoken phrase, such as, "I am sorry," or "the number," or a digit, e.g., "one," and a computer connects to an output amplifier one pickup head after another to compose a proper meaningful message. This requires many recordings, heads, and recording channels. It also requires considerable supervisory equipment for assuring that each head and each recording operates properly. Unfortunately, extensive supervisory equipment operating an alarm for each drum and head complicates already complex equipment. On the other hand, circuitry necessary to operate a single alarm-actuating relay reliably either requires duplicate amplifier stages for each channel being monitored or involves direct current amplifiers. The latter frequently load their inputs or, if they have high input impedances as well as the necessary high amplification, fail to operate relays reliably unless they are quite complex. In particular, simple direct current amplifiers that energize relays during conduction may, during cutoff, carry residual currents that are high enough to prevent relay cutout.

Thus, it is an object of the invention to monitor many conditions simultaneously with supervisory equipment simpler than herebefore obtainable.

Another object of the invention is to actuate alarm-actuating relays in response to slight direct currents by means of high input impedance, high amplification, direct current amplifiers of simple construction.

According to the invention these objects are accomplished in whole or in part by sensing the separate conditions to be monitored, combining the monitored output signals so that one or more departures from any desired conditions produces a single direct current error signal, then amplifying the direct current error signal to de-energize an alarm-actuating relay, while simultaneously sensing the voltage across the relay coil with a second amplifying device whose main path of current flow is in series with the relay coil so that only a slight change in relay coil voltage is sufficient to turn off the second amplifying device and hence the alarm-actuating relay.

More particularly, these objects are achieved by amplifying error signals with a high input impedance, high amplification Darlington-configuration switch to control currents through the relay, while sensing the relay voltage with a transistor whose emitter-collector path is in series with the relay and which is biased to saturate during full relay voltage but to cutoff during low relay voltage.

These and other features of the invention are pointed out specifically in the claims. Other objects and advantages of the invention are set forth or will become obvious from the following detailed description when read in light of the accompanying drawing wherein a partial block diagram and partial schematic diagram illustrate a message assembling system and supervisory circuit therefor.

In the drawing seven stationary magnetic pickup heads H1, H2, H3, H4, H5, H6, and H7 sense respective rotating magnetic drums DR1, DR2, DR3, DR4, DR5, DR6, and DR7 each continuously repeating a separate component of a message to be assembled. Although only seven drums and pickup heads are shown as parts of seven channels, these represent any desired number necessary for assembling particular messages required. For example, in a telephone automatic intercept bureau of a telephone exchange a message such as "I am sorry, the number you have reached one, two, three, four, five, six, seven has been changed to nine, eight, seven, six, five, four, three; please dial again" may have thirty constituent phrases, fourteen of which represent digits. Thirty drums and pickup heads forming parts of thirty channels would then be required instead of the seven illustrated. In an actual installation forty-eight to ninety-six drums and pickup heads are used as parts of a complete message assembling system.

In the illustrative embodiment seven audio-amplifiers RA1 to RA7 pass each of the respective signals from the seven heads H1 to H7 to an assembly system AS that sequentially selects the correct phrases and digits to produce the desired message. Such collective terms as "RA1 to RA7" or "H1 to H7" should be understood as meaning RA1, RA2, RA3, RA4, RA5, RA6, and RA7, or H1, H2, H3, H4, H5, H6, and H7. Seven demodulating transistors DT1 to DT7 of the seven channels sense the output of the amplifiers RA1 to RA7 through seven resistors IR1 to IR7 that isolate the demodulating transistors from the assembling system AS. Respective collector resistors CR1 to CR7 connect the transistors DT1 to DT7 to a positive energizing source PS while the emitters are grounded. The bases of transistors DT1 to DT7 are connected to the emitters through the source within the amplifiers RA1 to RA7. The bias at each of the bases of DT1 to DT7 is such that only the positive half cycles of the incoming signal are more positive than the grounded emitters of transistors DT1 and DT7 and only these positive half cycles are amplified.

When the transistors DT1 to DT7 do not conduct, the respective capacitors CC1 to CC7 charge toward the positive 48 volts of the source PS through the resistors CR1 to CR7 and RC1 to RC7. When positive signals appear through the resistors IR1 to IR7 the transistors DT1 to DT7 conduct. The capacitors CC1 to CC7 then discharge through the respective resistors RC1 to RC7 and through the transistors DT1 to DT7 toward the small collector voltage of the now conducting transistors DT1 to DT7. The time constant of each resistor-capacitor pair RC1–CC1 to RC7–CC7 is short enough to allow rapid discharge through the conducting transistors toward the small collector voltages; usually within a small fraction of a phrase being monitored. The charging time through resistors RC1 to RC7 and CR1 to CR7 is long enough to prevent any of the voltages across CC1 to CC7 from increasing to a certain critical value between the time a phrase sensed by any one of the heads H1 to H7 ends and the start of the phrase as it is repeated in the same head. However, this charging time of capacitors CC1 to CC7 through resistors RC1 to RC7 and CR1 to CR7 is sufficiently short for the capacitor voltage to ascend to the critical voltage value if the next repetition at any one head is too small for adequate conduction of its transistors DT1 to DT7. Thus, a failure on the part of any drum DR1 to DR7 to repeat a phrase or a failure on the part of one head H1 to H7 to sense it, or failure of one amplifier RA1 to RA7 to amplify it, raises the charge level of the corresponding capacitors CC1 to CC7.

The before-mentioned critical value is derived by biasing the cathodes of seven diodes D1 to D7 to 34.4 volts with two voltage dividing resistors VR1 to VR2 between ground and the +48 volt source PS. The anodes of diodes D1 to D7 follow the voltage of the collectors of respective transistors DT1 to DT7. If any head, for example the head H3, stops receiving signals from its recording drum DR3, then the voltage at the collector of transistor DT3 rises and the capacitor CC3 begins charging toward the 48 volt potential. By the time the phrase of the drum DR3 should have started repeating, the voltage rise of the collector does not exceed 34.4 volts. However, by the time the repeated phrase should have ended the voltage value at the collector of transistor DT3 rises beyond the 34.4 volt critical value established at the cathode of the diode D3. The diode D3 then conducts and raises the potential at the base of a p-n-p transistor Q1.

The resistors VR1 and VR2 also established a 34.4 volt biasing voltage for the base of the transistor Q1. The latter forms with a p-n-p transistor Q2 a switch or amplifier having a so-called Darlington configuration wherein the collectors connect together and the emitter of transistor Q1 connects to the base of transistor Q2. Dividing resistors DR1, DR2, and DR3 between the 48 volt source and ground establish at the emitter of transistor Q2 a potential of 35.0 volts. The 34.4 volt base potential and 35 volt emitter potential bias the emitter-base circuit of the switch Q1, Q2 so that the switch would be on when the collectors are properly energized.

Providing collector potential to an auxiliary n-p-n transistor Q3 is a manual switch SW1 which, when momentarily closed, saturates transistor Q3 by applying a voltage to the collector through a relay coil RL having a contact RLK1, and by applying a base voltage of 22.4 volts with two sensing resistors SR1 and SR2 connected as shown. This 22.4 volt base potential is higher than the potential of 21.5 appearing at the junction of the dividing resistors DR2 and DR3 to which junction the emitter of transistor Q3 connects. Conduction of transistor Q3 energizes relay coil RL and closes the contact RLK1. This energizes the collectors of switch Q1, Q2 so that it conducts despite subsequent opening of switch SW1. In this manner SW1 acts as a reset switch for the alarm.

The relay coil RL controls another, but normally closed, contact RLK2, which operates an alarm A when the relay is de-energized and the contact RLK2 permitted to return to its normal condition. Battery B energizes the alarm. A diode DB absorbs undesirable currents due to the inductance of relay coil RL.

In operation, the heads H1 to H7 all sense their corresponding magnetic drums DR1 to DR7 and transmit their signals through their amplifiers RA1 to RA7 to the assembling system AS as well as to the demodulating transistors DT1 to DT7. If all the drums and heads are operating properly and the assembling system is receiving correct signals the low charge on capacitors CC1 to CC7 keeps the voltage at the anodes of diodes LD1 to LD7 at a sufficiently low value to avoid affecting the biasing potential at the switch Q1, Q2. Under these circumstances as the switch SW1 is closed momentarily a 21.5 volt potential at the emitter of n-p-n transistor Q3 and the 35.0 volt potential at the junction of resistors DR1 and DR2 places sufficiently high potential on the base of transistor Q3 to saturate the transistor and produce high current flow through the relay coil RL. This closes the contact RLK1 and permits opening of the switch SW1. The 34.4 volt bias established at the base of transistor Q1 causes the switch Q1, Q2 to continue conducting and maintain the relay RL on. This opens the contact RLK2 and turns off alarm A.

If one of the drums DR1 to DR7, one of the heads H1 to H7, or one of the amplifiers RA1 to RA7 fails, no audio signal appears at one of the corresponding transistors DT1 to DT7. This turns off the transistor. The corresponding charging capacitor, one of CC1 to CC7 charges toward the 48 volt source PS raising the collector level. When the collector voltage exceeds 34.4 volts, the corresponding diode of the diodes D1 to D7 conducts in its easy current flow direction. When the collector level exceeds 35.0 volts the voltage at the base of transistor Q1 goes beyond 35.0 volts and hence beyond cutoff. Failure of transistors Q1 and Q2 to conduct ordinarily de-energizes relay coil RL, opens contact RLK1, closes contact RLK2, and turns on alarm A. An attendant then substitutes a standby recording system composed of new drums, heads, and amplifiers. Detailed investigation can reveal the cause of failure.

Unfortunately, the switch Q1, Q2 may not stop conducting when biased off at the base. The cutoff current $I_{co}$ may be so high that the coil RL is unable to release the contacts RLK1 and RLK2 despite cutoff. To assure reliability and prevent the $I_{co}$ of switch Q1, Q2 from energizing the relay coil RL to the point where it holds in contacts RLK1 and RLK2, the transistor Q3 exists in series with the coil RL. While the relay coil RL may be too sensitive to release in response to cutoff of switch Q1, Q2, the resistor SR1 and collector of transistor Q3 sense the voltage across the relay coil RL. If the voltage across coil RL drops due to decreased current in the switch Q1, Q2, the voltage at the base of transistor Q3 also drops or becomes more negative to the emitter of transistor Q3, thereby increasing the resistance of transistor Q3 to current flow and thereby further decreasing the voltage across the relay RL. This continues until the current through the relay RL becomes low enough to open the contact RLK1 and close the contact RLK2, thereby setting off the alarm A due to current from the battery B.

The switch Q1, Q2 has distinct advantages that dictate its use despite its high $I_{co}$. It has a high amplification equal to approximately $\beta_1\beta_2$ where $\beta_1$ and $\beta_2$ are the respective betas of Q1 and Q2. Moreover, it exhibits an unusually high input impedance. Substituting other direct current amplifiers of similar characteristics for the switch Q1, Q2 results in extremely complicated and unreliable circuitry. Still more complicated would be the addition of further amplification prior to the demodulating transistors DT1 and DT2. This is because at least one transistor would be necessary for each drum and head in each channel. Where forty-eight or ninety-six drums are prevalent, this can become bulky and costly.

However, in the illustrated embodiment, despite the effects of the switch Q1, Q2, a simple circuit is capable of responding to many recording heads and thereby monitoring a large system. When actuation of the alarm A occurs, an attendant can immediately substitute an identical system for the recording system presently in use and repair the inoperative system with conventional equipment.

While an embodiment of the invention has been described in detail, it will be obvious to those skilled in the art that the invention may be embodied otherwise without departing from its spirit and scope.

What is claimed is:

1. A monitoring system for supervising a plurality of conditions comprising, a plurality of sensing means each for one of said conditions, circuit means for combining the outputs of each of said sensing means and producing a departure from a given potential in response to departure of any of said conditions from a predetermined range, relay means, direct current amplifying means for responding to said circuit means and having a path of major current flow in series with said relay means for actuating said relay means, second amplifying means having a path of major current flow in series with said relay means and having input means responding to the voltage across said relay means for varying current flow when the voltage across said relay means varies, and indicator means responsive to said relay means.

2. A monitor system for supervising a plurality of conditions comprising, a plurality of sensing means each for one of said conditions, circuit means including a plurality of two-terminal diodes each connected at one terminal to one of said sensing means and connected together at the other terminal for combining the outputs of each of said sensing means and producing a departure from a given potential in response to departure of any of said conditions from a predetermined range, relay means, high-input-impedance direct-current amplifying means having two directly coupled transistors for responding to said circuit means and forming a path of major current flow in series with said relay means for actuating said relay means, second amplifying means having a path of major current flow in series with said relay means and having input means responding to the voltage across said relay means for reducing current flow when the voltage across said relay means decreases, and indicator means responsive to said relay means.

3. A monitor system for supervising a plurality of conditions comprising, a plurality of sensing means each for one of said conditions, circuit means for combining the outputs of each of said sensing means and producing a departure from a given potential in response to departure of any of said conditions from a predetermined range, relay means, direct current amplifying means for responding to said circuit means and having two transistors with connected collectors and having the emitter of one transistor connected to the base of the other transistor, said direct current amplifying means forming a path of major current flow in series with said relay means for actuating said relay means, second amplifying means having a path of major current flow in series with said relay means and having input means responding to the voltage across said relay means for varying current flow when the voltage across said relay means varies, and indicator means responsive to said relay means.

4. A monitor system for supervising a plurality of conditions comprising, a plurality of sensing means each for one of said conditions, circuit means including a plurality of two-terminal diodes each connected at one terminal to one of said sensing means and connected together at the other terminal for combining the outputs of each of said sensing means and producing a departure from a given potential in response to departure of any of said conditions from a predetermined range, relay means, a semiconductor Darlington configuration switch responding to said circuit means and having a path of major current flow in series with said relay means for actuating said relay means, second amplifying means having a path of major current flow in series with said relay means and having input means responding to the voltage across said relay means for reducing current flow when the voltage across said relay means decreases, and indicator means responsive to said relay means.

5. A monitor system for supervising a plurality of conditions comprising, a plurality of sensing means each for one of said conditions, circuit means for combining the outputs of each of said sensing means and producing a departure from a given potential in response to departure of any of said conditions from a predetermined range, relay means, high-input-impedance direct-current amplifying means having two directly coupled transistors for responding to said circuit means and forming a path of major current flow in series with said relay means for actuating said relay means, second amplifying means having a path of major current flow in series with said relay means and having input means responding to the voltage across said relay means for reducing current flow when the voltage across said relay means decreases, indicator means responsive to said relay means, said relay means having a coil in series with the paths of major current flow of said direct current amplifying means and said second amplifying means and having a contact in series with said coil, said contact being biased open when said coil is unenergized, and switch means connected to short selectively said direct current amplifying means and said contact so as to start energizing said relay coil.

6. A monitor system for supervising a plurality of conditions comprising, a plurality of sensing means each for one of said conditions, circuit means for combining the outputs of each of said sensing means and producing a departure from a given potential in response to departure of any of said conditions from a predetermined range, relay means, a semiconductor Darlington configuration switch responding to said circuit means and having a path of major current flow in series with said relay means for actuating said relay means, second amplifying means having a path of major current flow in series with said relay means and having input means responding to the voltage across said relay means for reducing current flow when the voltage across said relay means decreases, indicator means responsive to said relay means, said relay means having a coil in series with the paths of major current flow of said direct current amplifying means and said second amplifying means and having a contact in series with said coil, said contact being mechanically open when said coil is unenergized, and switch means connected to short selectively said direct current amplifying means and said contact so as to start energizing said relay coil.

7. A monitor system for supervising a plurality of conditions comprising, a plurality of sensing means each for one of said conditions, circuit means including a plurality of two-terminal diodes each connected at one terminal to one of said sensing means and connected at the other terminal for combining the outputs of each of said sensing means and for producing a single departure from a given potential in response to departure of any of said conditions from a predetermined range, relay means, direct current amplifying means for responding to said circuit means and having input and output transistors with connected collectors and having the emitter of said input transistor connected to the base of said output transistor, said transistors together forming a path of major current flow in series with said relay means for actuating said relay means, second amplifying means having a path of major current flow in series with said relay means and having input means responding to the voltage across said relay means for reducing current flow when the voltage across said relay means decreases, indicator means responsive to said relay means, said relay means having a coil in series with the paths of major current flow of said direct current amplifying means and said second amplifying means and having a contact in series with said coil, said contact being mechanically open when said coil is unenergized, and switch means connected to short selectively said direct current amplifying means and said contact so as to start energizing said relay coil.

8. A monitor system for supervising a plurality of conditions comprising, a plurality of sensing means each for one of said conditions, circuit means for combining the outputs of each of said sensing means and for producing a departure from a given potential in response to departure of any of said conditions from a predetermined range, relay means, direct current amplifying means for responding to said circuit means and having input and output transistors with connected collectors and having the emitter of said input transistor connected to the base of said output transistor, said transistors forming a path of major current flow in series with said relay means for actuating said relay means, second amplifying means having a path of major current flow in series with said relay means and having input means responding to the voltage across said relay means for reducing current flow when the voltage across said relay means decreases, indicator means responsive to said relay means, said direct current amplifying means having both transistors of the same conductivity, said second amplifying means having a transistor of opposite conductivity to said transistors of said direct current amplifying means, said transistor in said second amplifying means having a collector connected to said relay means, said input means of said second amplifying means comprising an impedance connected from the end of said relay means opposite the collector and to the base of said transistor in said second amplifying means, and a second impedance connecting said base to the emitter of said transistor in said second amplifier.

9. A monitor system for supervising a plurality of conditions comprising, a plurality of sensing means each for one of said conditions, circuit means including a plurality of two-terminal diodes each connected at one terminal to one of said sensing means and connected together at the other terminal for combining the outputs of each of said sensing means and for producing a departure from a given potential in response to departure of any of said conditions from a predetermined range, relay means, direct current amplifying means for responding to said circuit means and having input and output transistors with connected collectors and having the emitter of said input transistor connected to the base of the output transistor, said transistors together forming a path of major current flow in series with said relay means for actuating said relay means, second amplifying means having a path of major current flow in series with said relay means and having input means responding to the voltage across said relay means for reducing current flow when the voltage across said relay means decreases, indicator means responsive to said relay means, said relay means having a coil in series with the paths of major current flow of said direct current amplifying means and said second amplifying means and having a contact in series with said coil, said contact being mechanically open when said coil is unenergized, switch means connected to short selectively said direct current amplifying means and said contact so as to manually energize said relay coil, said direct current amplifying means having both transistors of the same conductivity, said second amplifying means having a transistor of opposite conductivity to said transistors of said direct current amplifying means, said transistor in said second amplifying means having a collector connected to said relay coil, said input means comprising an impedance connected from the end of said relay coil opposite the collector and to the base of said transistor in said second amplifying means, and a second impedance connecting said base to the emitter of said transistor in said second amplifier.

References Cited

UNITED STATES PATENTS

| | | | |
|---|---|---|---|
| 3,124,992 | 3/1964 | Thaler | 340—414 |
| 3,153,176 | 10/1964 | Clay | 340—213 |
| 3,210,749 | 10/1965 | Magor | 340—414 |

THOMAS B. HABECKER, *Primary Examiner.*

U.S. Cl. X.R.

179—100.2; 307—235; 317—148.5